(12) United States Patent
Xia et al.

(10) Patent No.: US 9,565,470 B2
(45) Date of Patent: *Feb. 7, 2017

(54) SET-TOP-BOX HAVING A BUILT-IN MASTER NODE THAT PROVIDES AN EXTERNAL INTERFACE FOR COMMUNICATION AND CONTROL IN A POWER-LINE-BASED RESIDENTIAL COMMUNICATION SYSTEM

(71) Applicant: ASOKA USA CORPORATION, Santa Clara, CA (US)

(72) Inventors: Mingyao Xia, Shenzhen (CN); Eric Grubel, Thousand Oaks, CA (US); Dan Castellano, Cupertino, CA (US)

(73) Assignee: ASOKA USA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/975,414

(22) Filed: Dec. 18, 2015

(65) Prior Publication Data

US 2016/0105713 A1 Apr. 14, 2016

Related U.S. Application Data

(63) Continuation of application No. 13/181,293, filed on Jul. 12, 2011, now Pat. No. 9,257,842, which is a
(Continued)

(51) Int. Cl.
| | |
|---|---|
| *H04N 7/173* | (2011.01) |
| *H04N 7/16* | (2011.01) |
| *H04N 21/436* | (2011.01) |
| *H02J 3/14* | (2006.01) |
| *H04N 21/426* | (2011.01) |
| *H02J 13/00* | (2006.01) |

(52) U.S. Cl.
CPC ........... *H04N 21/43615* (2013.01); *H02J 3/14* (2013.01); *H02J 13/0082* (2013.01); *H04N 21/42676* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
CPC .................................................... H04N 21/443
USPC ................................................. 725/130, 150
See application file for complete search history.

(56) References Cited

U.S. PATENT DOCUMENTS

| 5,090,024 A | 2/1992 | Vander Mey et al. |
| 5,553,072 A | 9/1996 | Daggett et al. |
| (Continued) | | |

OTHER PUBLICATIONS

Heile, "Smart Grids for Green Communications", IEEE Wireless Communications, Jun. 2010, pp. 4-6 (online). Retrieved on Jul. 4, 2012, internet URL:,http://dl.comsoc.org/livepubs/pci/public/2010/jun/pdf/wciindpersp.pdf>, entire document, 4-6.

*Primary Examiner* — Michael Hong
(74) *Attorney, Agent, or Firm* — Michael A. Glenn; Perkins Coie LLP

(57) ABSTRACT

A set-top-box (STB) provides capability for monitoring and control of power usage and the ability to establish communications. A smart residential service system (SRSS) is provided that uses power line communication (PLC) technology to provide secure in-home LAN communication and also to monitor and provide remote control of connected appliances in the home. An embodiment combines the STB with a master unit (MST) that is used with PLC to meet the requirements of the central device in the SRSS.

28 Claims, 8 Drawing Sheets

Related U.S. Application Data continuation-in-part of application No. 13/153,194, filed on Jun. 3, 2011, now Pat. No. 8,364,326, which is a continuation-in-part of application No. 13/032,454, filed on Feb. 22, 2011, now Pat. No. 8,755,946.

(56) References Cited

U.S. PATENT DOCUMENTS

| | | |
|---|---|---|
| 5,572,438 A | 11/1996 | Ehlers et al. |
| 5,630,204 A | 5/1997 | Hylton et al. |
| 5,999,612 A | 12/1999 | Dunn et al. |
| 6,252,883 B1 | 6/2001 | Schweickart et al. |
| 6,378,131 B2 | 4/2002 | Cunningham et al. |
| 6,453,687 B2 | 9/2002 | Sharood et al. |
| 6,553,418 B1 | 4/2003 | Collins et al. |
| 6,633,823 B2 | 10/2003 | Bartone et al. |
| 6,826,607 B1 | 11/2004 | Gelvin et al. |
| 6,834,045 B1 | 12/2004 | Lappeteläinen et al. |
| 6,854,059 B2 | 2/2005 | Gardner |
| 6,882,709 B1 | 4/2005 | Sherlock et al. |
| 6,934,862 B2 | 8/2005 | Sharood et al. |
| 6,956,464 B2 | 10/2005 | Wang et al. |
| 6,961,641 B1 | 11/2005 | Forth et al. |
| 6,988,025 B2 | 1/2006 | Ransom et al. |
| 6,990,395 B2 | 1/2006 | Ransom et al. |
| 6,993,417 B2 | 1/2006 | Osann, Jr. |
| 7,020,701 B1 | 3/2006 | Gelvin et al. |
| 7,113,763 B2 | 9/2006 | Heinonen et al. |
| 7,136,936 B2 | 11/2006 | Chan et al. |
| 7,142,094 B1 | 11/2006 | Davidow et al. |
| 7,173,938 B1 | 2/2007 | Davidow |
| 7,194,528 B1 | 3/2007 | Davidow |
| 7,231,280 B2 | 6/2007 | Costa |
| 7,231,281 B2 | 6/2007 | Costa |
| 7,245,472 B2 | 7/2007 | Davidow |
| 7,319,717 B2 | 1/2008 | Zitting |
| 7,345,998 B2 | 3/2008 | Cregg et al. |
| 7,363,398 B2 | 4/2008 | Scott |
| 7,415,541 B2 | 8/2008 | Chan et al. |
| 7,423,546 B1 | 9/2008 | Aisa |
| 7,444,401 B1 | 10/2008 | Keyghobad et al. |
| 7,461,174 B2 | 12/2008 | Chan et al. |
| 7,463,986 B2 | 12/2008 | Hayes |
| 7,688,841 B2 | 3/2010 | Binder |
| 7,690,949 B2 | 4/2010 | Binder |
| 7,701,331 B2 | 4/2010 | Tran |
| 7,734,380 B2 | 6/2010 | Ransom et al. |
| 7,734,572 B2 | 6/2010 | Wiemeyer et al. |
| 7,738,999 B2 | 6/2010 | Petite |
| 7,751,795 B2 | 7/2010 | McCarty et al. |
| 7,752,309 B2 | 7/2010 | Keyghobad et al. |
| 7,769,907 B2 | 8/2010 | Chan et al. |
| 7,769,908 B2 | 8/2010 | Chan et al. |
| 7,773,361 B2 | 8/2010 | Davidow |
| 7,778,152 B2 | 8/2010 | Chan |
| 7,825,793 B1 | 11/2010 | Spillman et al. |
| 7,826,395 B2 | 11/2010 | Kim et al. |
| 7,848,759 B2 | 12/2010 | Kim et al. |
| 7,961,111 B2 | 6/2011 | Tinaphong et al. |
| 8,213,895 B2 | 7/2012 | Hurwitz et al. |
| 8,290,628 B2 | 10/2012 | Yeo |
| 8,295,990 B2 | 10/2012 | Venkatakrishnan et al. |
| 8,306,634 B2 | 11/2012 | Nguyen et al. |
| 8,364,326 B2 | 1/2013 | Xia et al. |
| 8,374,729 B2 | 2/2013 | Chapel et al. |
| 8,412,387 B2 | 4/2013 | Park et al. |
| 8,503,150 B2 | 8/2013 | Chang |
| 8,644,166 B2 | 2/2014 | Xia et al. |
| 8,868,248 B2 | 10/2014 | Park |
| 9,063,528 B2 | 6/2015 | Xia et al. |
| 2002/0023267 A1 | 2/2002 | Hoang |
| 2002/0026532 A1 | 2/2002 | Maeda et al. |
| 2002/0026646 A1 | 2/2002 | Hoang |
| 2002/0114336 A1 | 8/2002 | Chow |
| 2002/0165943 A1 | 11/2002 | Hoang |
| 2002/0170059 A1 | 11/2002 | Hoang |
| 2003/0050737 A1 | 3/2003 | Osann, Jr. |
| 2004/0022304 A1 | 2/2004 | Santhoff et al. |
| 2004/0070912 A1 | 4/2004 | Kopp |
| 2004/0106412 A1 | 6/2004 | Laroia et al. |
| 2004/0138786 A1 | 7/2004 | Blackett et al. |
| 2004/0139472 A1 | 7/2004 | Furet et al. |
| 2004/0148632 A1 | 7/2004 | Park et al. |
| 2004/0155985 A1 | 8/2004 | Dethier |
| 2004/0193329 A1 | 9/2004 | Ransom et al. |
| 2004/0203989 A1 | 10/2004 | Karaoguz |
| 2004/0212481 A1 | 10/2004 | Abraham |
| 2005/0008345 A1 | 1/2005 | Choi |
| 2005/0018766 A1 | 1/2005 | Iwamura |
| 2005/0030968 A1 | 2/2005 | Rich et al. |
| 2005/0157215 A1 | 7/2005 | Minnick et al. |
| 2005/0160467 A1 | 7/2005 | Moons et al. |
| 2005/0184867 A1 | 8/2005 | Osann, Jr. |
| 2005/0207079 A1 | 9/2005 | Tiller et al. |
| 2005/0272402 A1 | 12/2005 | Ferentz et al. |
| 2006/0049694 A1 | 3/2006 | Kates |
| 2006/0083206 A1 | 4/2006 | Min |
| 2006/0088149 A1 | 4/2006 | Sung |
| 2006/0099954 A1 | 5/2006 | Henderson et al. |
| 2006/0168624 A1 | 7/2006 | Carney et al. |
| 2006/0222086 A1 | 10/2006 | Frye, Jr. |
| 2006/0227884 A1 | 10/2006 | Koga et al. |
| 2007/0043477 A1 | 2/2007 | Ehlers et al. |
| 2007/0061487 A1 | 3/2007 | Moore et al. |
| 2007/0130598 A1 | 6/2007 | Choi et al. |
| 2007/0132579 A1 | 6/2007 | Kim |
| 2007/0183543 A1 | 8/2007 | Lu |
| 2007/0204286 A1 | 8/2007 | Candelore |
| 2007/0213879 A1 | 9/2007 | Iwamura |
| 2007/0229231 A1 | 10/2007 | Hurwitz et al. |
| 2007/0233323 A1 | 10/2007 | Wiemeyer et al. |
| 2007/0250900 A1 | 10/2007 | Marcuvitz |
| 2008/0015740 A1 | 1/2008 | Osann, Jr. |
| 2008/0024605 A1 | 1/2008 | Osann, Jr. |
| 2008/0106146 A1 | 5/2008 | Baek et al. |
| 2008/0130640 A1 | 6/2008 | Hurwitz et al. |
| 2008/0137572 A1 | 6/2008 | Park et al. |
| 2008/0195562 A1 | 8/2008 | Worth et al. |
| 2008/0221737 A1 | 9/2008 | Josephson et al. |
| 2008/0259888 A1 | 10/2008 | Terashima |
| 2008/0317070 A1 | 12/2008 | Propp et al. |
| 2009/0040057 A1 | 2/2009 | Keyghobad et al. |
| 2009/0093916 A1 | 4/2009 | Parsonnet et al. |
| 2009/0099629 A1 | 4/2009 | Carson et al. |
| 2009/0117915 A1 | 5/2009 | Lee et al. |
| 2009/0135848 A1 | 5/2009 | Chan et al. |
| 2009/0175321 A1 | 7/2009 | Sasaki et al. |
| 2009/0182862 A1 | 7/2009 | Thomson et al. |
| 2009/0187499 A1 | 7/2009 | Mulder et al. |
| 2009/0190553 A1 | 7/2009 | Masuda et al. |
| 2009/0195349 A1 | 8/2009 | Frader-Thompson et al. |
| 2009/0225679 A1 | 9/2009 | Bims |
| 2009/0262665 A1 | 10/2009 | Kim et al. |
| 2009/0287838 A1 | 11/2009 | Keyghobad et al. |
| 2009/0287966 A1 | 11/2009 | Keyghobad et al. |
| 2009/0319853 A1 | 12/2009 | Keyghobad et al. |
| 2010/0027599 A1 | 2/2010 | Di Chiro et al. |
| 2010/0070217 A1 | 3/2010 | Shimada et al. |
| 2010/0075661 A1 | 3/2010 | Li |
| 2010/0076701 A1 | 3/2010 | Harish |
| 2010/0082499 A1 | 4/2010 | Luff |
| 2010/0091745 A1 | 4/2010 | Bevan et al. |
| 2010/0094475 A1 | 4/2010 | Masters et al. |
| 2010/0095335 A1 | 4/2010 | Wilson et al. |
| 2010/0097528 A1 | 4/2010 | Seo |
| 2010/0102987 A1 | 4/2010 | Lou et al. |
| 2010/0105336 A1 | 4/2010 | Attar et al. |
| 2010/0106342 A1 | 4/2010 | Ko et al. |
| 2010/0121968 A1 | 5/2010 | Clark |
| 2010/0128711 A1 | 5/2010 | Klein et al. |
| 2010/0138066 A1 | 6/2010 | Kong |
| 2010/0156666 A1 | 6/2010 | Choi et al. |
| 2010/0169940 A1 | 7/2010 | Howarter et al. |
| 2010/0182160 A1 | 7/2010 | Lu |

(56) References Cited

U.S. PATENT DOCUMENTS

| | | |
|---|---|---|
| 2010/0204850 A1 | 8/2010 | Henderieckx |
| 2010/0207728 A1 | 8/2010 | Roscoe et al. |
| 2010/0217449 A1 | 8/2010 | Musti et al. |
| 2010/0228601 A1 | 9/2010 | Vaswani et al. |
| 2010/0233975 A1 | 9/2010 | Wu et al. |
| 2010/0241245 A1 | 9/2010 | Wiemeyer et al. |
| 2010/0250497 A1 | 9/2010 | Redlich et al. |
| 2010/0292858 A1 | 11/2010 | Iwamura |
| 2010/0327766 A1 | 12/2010 | Recker et al. |
| 2010/0332164 A1 | 12/2010 | Aisa et al. |
| 2011/0035491 A1 | 2/2011 | Gelvin et al. |
| 2011/0037589 A1 | 2/2011 | Liu et al. |
| 2011/0040785 A1 | 2/2011 | Steenberg et al. |
| 2011/0054700 A1 | 3/2011 | Chan et al. |
| 2011/0054710 A1 | 3/2011 | Imes et al. |
| 2011/0066300 A1 | 3/2011 | Tyagi et al. |
| 2011/0077758 A1 | 3/2011 | Tran et al. |
| 2011/0082599 A1 | 4/2011 | Shinde et al. |
| 2011/0087522 A1 | 4/2011 | Beaty et al. |
| 2011/0093221 A1 | 4/2011 | Dhanjal |
| 2011/0121654 A1 | 5/2011 | Recker et al. |
| 2011/0147190 A1 | 6/2011 | GaleWyrick et al. |
| 2011/0161251 A1 | 6/2011 | Carey et al. |
| 2011/0184581 A1 | 7/2011 | Storch et al. |
| 2011/0196547 A1 | 8/2011 | Park et al. |
| 2011/0202190 A1 | 8/2011 | Venkatakrishnan et al. |
| 2011/0202198 A1 | 8/2011 | Venkatakrishnan et al. |
| 2011/0202910 A1 | 8/2011 | Venkatakrishnan et al. |
| 2011/0215736 A1 | 9/2011 | Horbst et al. |
| 2011/0231320 A1 | 9/2011 | Irving |
| 2011/0238235 A1 | 9/2011 | Xia |
| 2011/0263277 A1 | 10/2011 | Zuniga Gallegos |
| 2011/0264286 A1 | 10/2011 | Park |
| 2011/0264291 A1 | 10/2011 | Le Roux et al. |
| 2011/0271317 A1 | 11/2011 | Xia et al. |
| 2011/0307109 A1 | 12/2011 | Sri-Jayantha |
| 2012/0001548 A1 | 1/2012 | Recker et al. |
| 2012/0053737 A1 | 3/2012 | Valluri et al. |
| 2012/0066023 A1 | 3/2012 | Xia et al. |
| 2012/0095610 A1 | 4/2012 | Chapel et al. |
| 2012/0109395 A1 | 5/2012 | Finch et al. |
| 2012/0265357 A1 | 10/2012 | Song et al. |
| 2012/0271472 A1 | 10/2012 | Brunner et al. |
| 2013/0013234 A1 | 1/2013 | Ahmed et al. |
| 2013/0054044 A1 | 2/2013 | Shaffer et al. |
| 2013/0116846 A1 | 5/2013 | Galsim et al. |
| 2013/0158911 A1 | 6/2013 | Young et al. |

US 9,565,470 B2

SET-TOP-BOX HAVING A BUILT-IN MASTER NODE THAT PROVIDES AN EXTERNAL INTERFACE FOR COMMUNICATION AND CONTROL IN A POWER-LINE-BASED RESIDENTIAL COMMUNICATION SYSTEM

CROSS REFERENCE TO RELATED APPLICATIONS

This application is a Continuation of U.S. application Ser. No. 13/181,293, filed 12 Jul. 2011, which is a Continuation-in-Part of U.S. application Ser. No. 13/153,194, filed 3 Jun. 2011, which was issued as U.S. Pat. No. 8,364,326 on 29 Jan. 2013, which is a Continuation-in-Part of U.S. application Ser. No. 13/032,454, filed 22 Feb. 2011, which was issued as U.S. Pat. No. 8,755,946 on 17 Jun. 2014, each of which is incorporated herein in its entirety by this reference thereto.

BACKGROUND OF THE INVENTION

Technical Field

The invention relates to devices that are used for power monitoring, data collection, and control and communication over power lines to reduce the carbon footprint of in-home equipment. More particularly, the invention relates to centralized control of intelligent homes, in which multiple entertainment, communication, media streaming, and other appliances are connected to remote power monitoring and control capable devices for power usage monitoring and control over power line networking.

Description of the Background Art

Communication using power lines has been known from early in the 20$^{th}$ century. Due to the higher cost and other limitations for extending the connectivity, the use of this type of power line communication (PLC) system has been limited to local area networks (LANs) within homes or offices or, at best, within apartment complexes. PLC has also found a limited number of applications where other types of communication methods do not provide the security and remote connectivity, such as for power line control applications. Basic devices for connecting to the power line for communication and power supply have been designed and used to provide service within LANs.

Due to more efficient competing technologies, the infrastructure for power line communication never developed to make it a mainstream technology. Thus, despite this early start, PLC technology has not become a mainstream communication technology and the adaptation of this technology has been slow. This can be attributed to various reasons, including the higher cost of available devices, the lack of suitable devices for communication using PLC technology, etc. The result has been that PLC has not found a path for growth in the standard voice and data communication field, which is presently catered to by technologies such as xDSL, cell phones, and satellite communications.

The development of 'green' technologies and the need for monitoring and control of the carbon footprint of homes and offices has created a need to assess power usage patterns remotely, determine the magnitude of such usage, and provide the ability to supervise and control such power usage remotely. In such case, it is necessary for the consumer to monitor and control the power use on a micro level. If the proper tools were provided, the consumer could be able to exercise the necessary constraints on such power usage.

It is also necessary to monitor the usage pattern and collect data on a macro level to develop policies that are beneficial to the overall reduction in the carbon footprint at the home and office level, as well as on a national level. Empowering the individual and the society to exercise the necessary controls by monitoring the power usage is an area where the power line communication and control can be effectively and optimally used.

SUMMARY OF THE INVENTION

A set-top-box (STB) provides capability for monitoring and control of power usage and the ability to establish communications. A smart residential service system (SRSS) is provided that uses power line communication (PLC) technology to provide secure in-home LAN communication and also to monitor and provide remote control of connected appliances in the home. An embodiment combines the STB with a master unit (MST) that is used with PLC to meet the requirements of the central device in the SRSS.

DETAILED DESCRIPTION OF THE INVENTION

Increasingly, consumers are moving to 'intelligent' homes in which multiple entertainment systems and communications facilities are interconnected via local area networks (LANs). The push for 'green' homes ostensibly mandates monitoring and remote control of power usage by home appliances. As new applications and services that link these different devices are developed, the need for a central device that controls that information flow has emerged.

Cable-to-home is becoming a more common communication gateway to homes because the download speeds are very high and upload speeds are comparable to that of other technologies, such as xDSL and wireless. Cable inputs to the home are typically terminated in a cable modem that includes a cable communication modem and a video input module which connect to the in-home local area network (LAN). In an embodiment, a set-top-box (STB) provides capability for monitoring and control of power usage and the ability to establish communications. A smart residential service system (SRSS) is provided that uses power line communication (PLC) technology to provide secure in-home LAN communication and also to monitor and provide remote control of connected appliances in the home. An embodiment combines the STB with a master unit (MST) that is used with PLC to meet the requirements of the central device in the SRSS.

Figure 1:
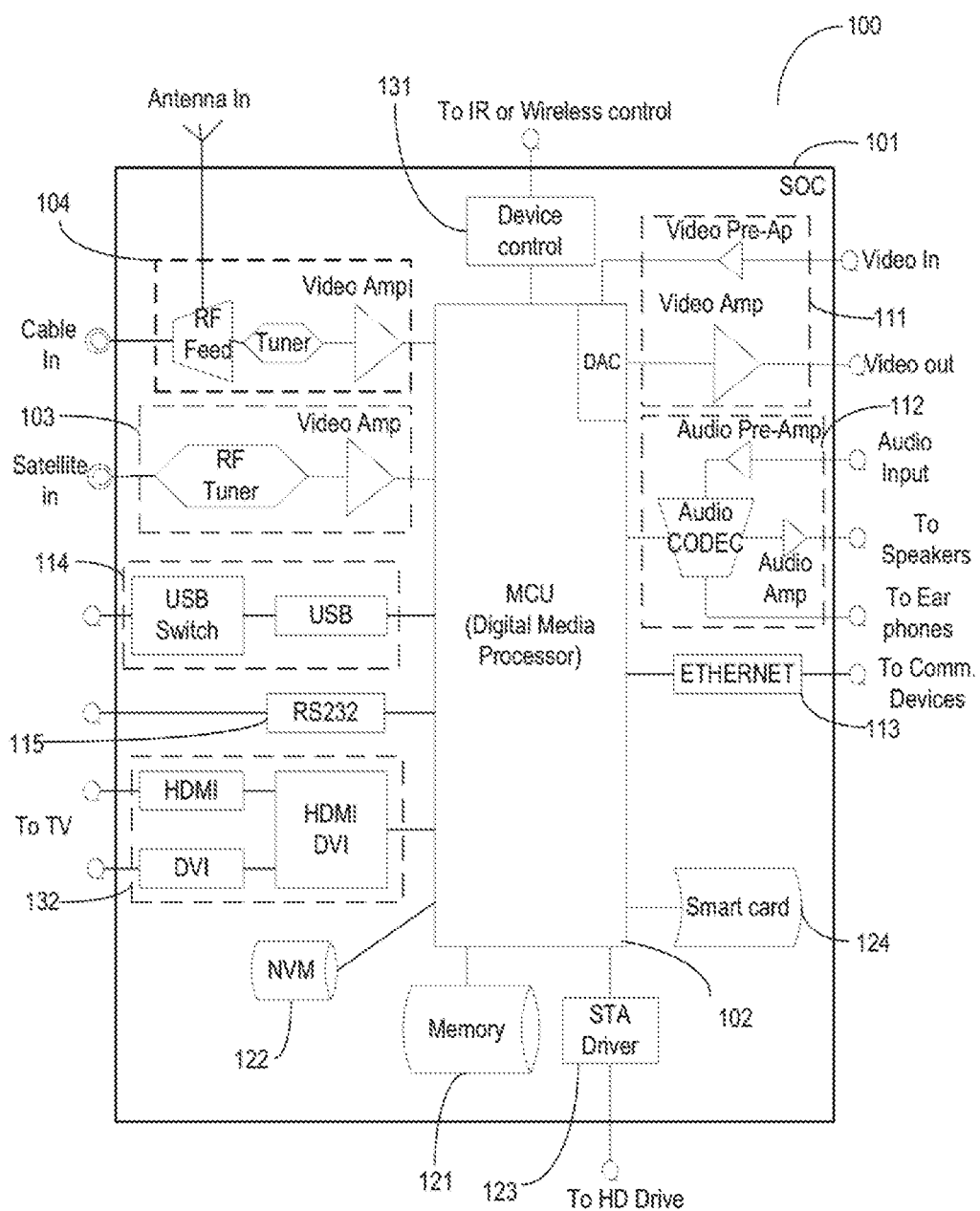
FIG. 1 is a block schematic diagram of a typical STB.

A set-top box (STB) is a device that is a central controller for the multiple entertainment systems in the home. FIG. 1 is a block diagram showing a typical STB 100. The STB uses a microcontroller (MCU) 102 as a digital media processor. The MCU and the various inputs and outputs and control units are integrated into a system on chip (SOC) 101. The inputs to the STB 100 typically include a cable and antenna input block 104 and a satellite input block 103. The control inputs of the STB use infra-red (IR) or wireless 131. The input/output (I/O) components of the STB 100 include the video I/O block 111, the audio I/O block 112, the Ethernet connector 113, the USB connector 144, and the RS232 connector 115. The storage capabilities built into the STB include a built in random access memory (RAM) 121, a non-volatile memory (NVM) 122, a high density disk drive (HDD) 123, and smart card 124. Additionally, the STB has outputs to the TV from HDMI and DVI connectors 132.

With the addition of new entertainment applications and services that link different entertainment devices for use in the home, there is need for central as well as distributed control capability for these applications. By providing a built-in cable modem, the STB becomes the gateway to the Internet, and functions to control the information flow into the home over the cable network. By integrating a master switch unit (MST) into the STB, the capability for establishing a connection to an in-home PLC network is also integrated into the STB. This, in turn, allows the STB to act as a central control unit for in-home entertainment applications, with distribution and control capability over a PLC network for communication, streaming media, TV, and other entertainment systems in the home. This central control capability is provided in addition to the local controls available for the entertainment systems and TV systems at the installed location. Further, the functions of power monitoring and remote control of the supply of power to appliances by the MST in the STB is enabled by use of the power monitoring and control units, the power switch unit (SW), and the data communication (Ethernet) enabled power switch unit (ETH) to interconnect the in-home systems and appliances.

Figure 2:
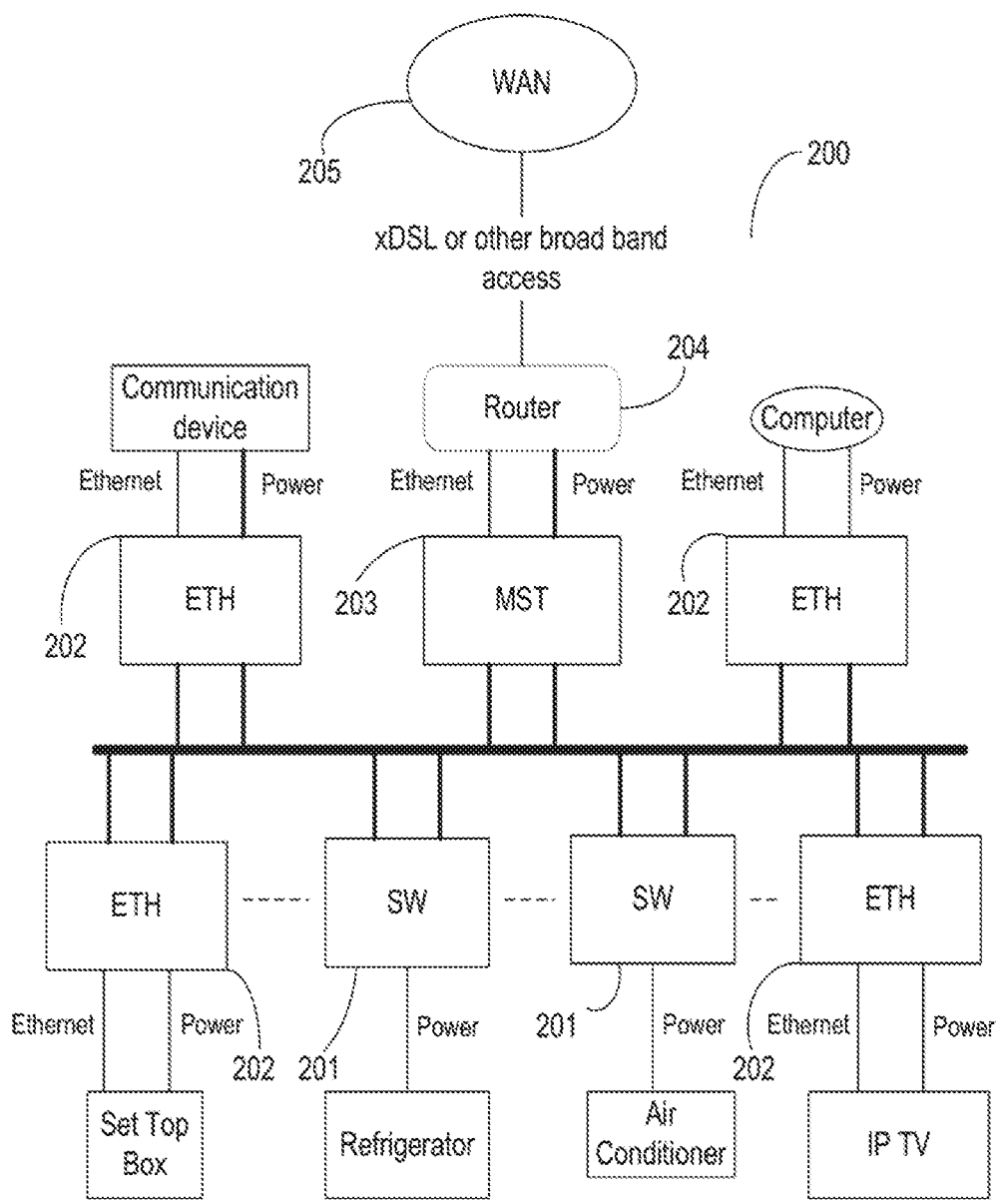
FIG. 2 is a block schematic diagram of a PLC network connection that provides communication capability with monitoring and remote control of connected appliances according to the invention.

FIG. 2 is a block schematic diagram showing a PLC network 200 for power management and communication connectivity using the PLC based units, including an MST 203, SW 201, and ETH 202 according to the invention. The SW 201 units are used where the requirement is for power connection capability with monitoring and control, but without the need to connect a communication device into the PLC network 200. The ETH devices provide communication device connections to the PLC LAN and a power plug or power source which can be monitored and controlled. Multiple SW 201 and ETH 202 units can be used to establish power monitoring and control for the home and to provide connectivity for data communication on a PLC LAN in the PLC network 200. The MST 203 is connects the PLC network 200 through a router 204, thus providing the PLC network with broadband access to a wide area network (WAN) 205.

The MST 203 also provides the computing power and storage capability necessary to collect and compile power consumption information. The SW 201 units and ETH 202 units monitor the power usage of devices and appliances connected to their respective power plugs. This information is sent over the local power distribution lines in the home or office to the MST 203 for compilation of data on usage. With the capability and computing power it has available, an embodiment of the MST 203 can exert local and emergency control of the appliances connected to the SWs 201 and ETH 202 units. As discussed earlier, the MST 203 also acts as a gateway by connecting to a broadband communication modem in the router 204 to enable a communication pathway to the Internet 205, e.g. via the WAN.

Figure 3:
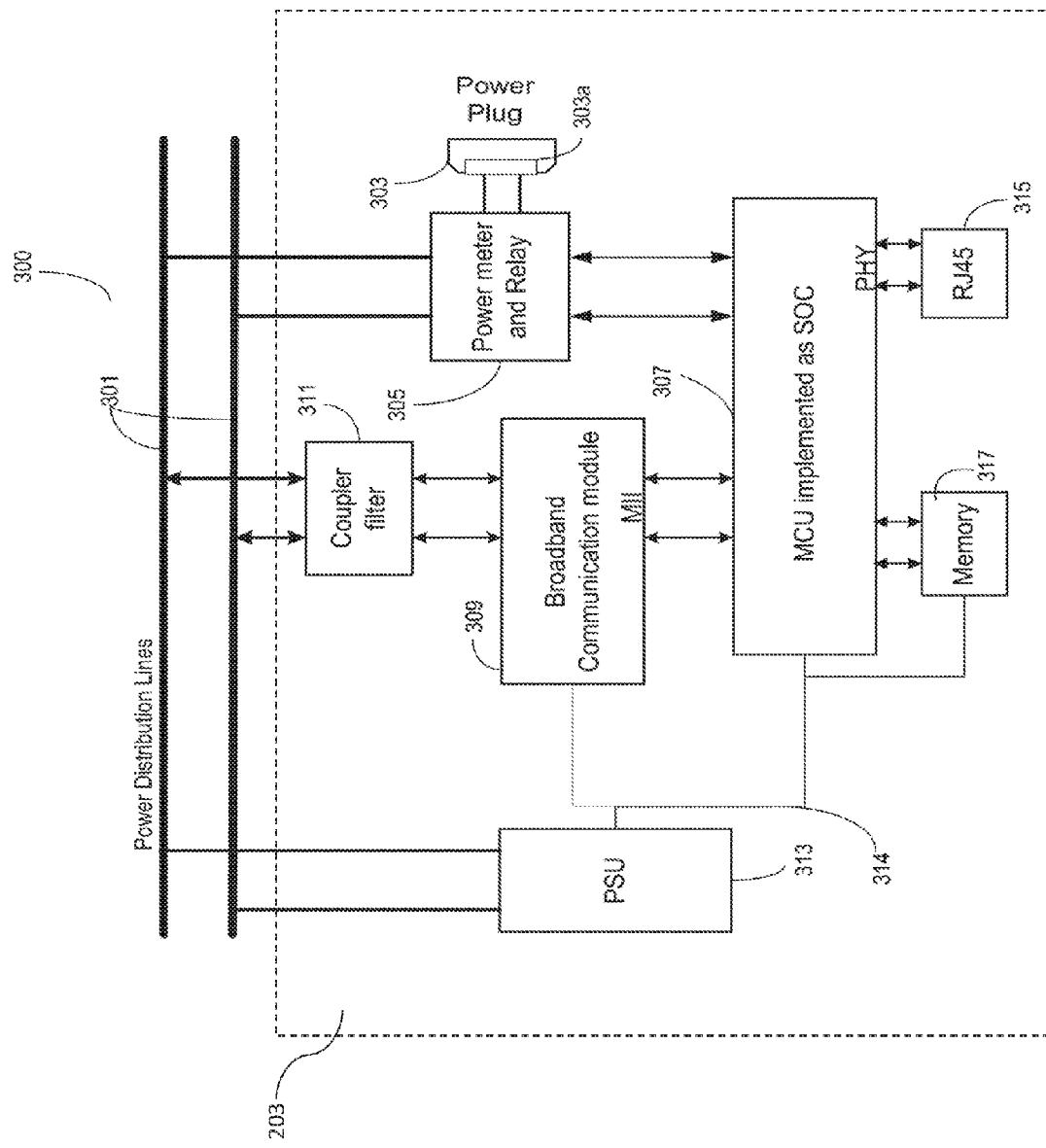
FIG. 3 is a block schematic diagram of a master power switch according to the invention.

FIG. 3 is a block schematic diagram 300 of an MST 203. In this embodiment, a 32-bit MCU is implemented as a system on chip (SOC) 307. The SOC 307 provides higher processing power and integration of modules with the MCU. The SOC 307 integrates a PHY into the MCU, thus providing the RJ45 connector 315 that connects modem device directly to a port on the SOC 307. In this embodiment, this connection is a 10/100 base TX, auto-negotiation Ethernet port. This provides a gateway to the Internet through a connected modem for PLC communications from all of the ETH 202 units connected thereto via the PLC LAN.

A typical communication module of the MST 203 uses a modulation scheme that is chosen from among various known modulation protocols, including OFDM, QAM1024/256/64/16, DQPSK, DBPSK, and ROBO, for sending and receiving communication data streams to the connected ETH 202 units within the PLC LAN. In this embodiment, the frequency band used for broadband PLC within the LAN is 2 to 30 MHz, with a data transfer rate of up to 200 Mbps.

The gateway provided by the MST 203 is also used to send out the collected and processed information on the power usage, as well as the status of the power monitoring and relay units within the PLC network 200. This enables control of the power plug 303. Any remote control commands that are received from the Web via the gateway by the MST 203 are transferred to connected SW 201 units for control of the power flow to connected appliances. In the case of the embodiment of the MST 203 shown in FIG. 3, the modulation, frequency band, and data rates are the same as those used for the information and command transfer within the PLC network 200.

The SOC 307 is configured to enforce all communication-related security protocols associated with the PLC LAN. Further, all data and power monitoring and control information is sent to the SOC 307 by the connected SW 201 and ETH 202 units via the power distribution lines 301 through the coupler filter module 311 and the communication module 309. The communication module 309 of the MST 203 is used to demodulate the incoming streams and decrypt them, prior to transferring them to the MCU. The SOC 307 receives the information and processes it by compiling and consolidating it for outward transmission to the Web 205 through the router 204.

The SOC 307 also has a memory 317 associated with it that, in this embodiment, is connected to a memory port on the SOC 307. The memory 317 stores the received power monitoring and control information prior to its processing and compiling by the SOC 307. The memory 317 is also used to store the compiled information so as to transmit it out through the router 204 optimally when bandwidth usage for data communication is low. The memory 317 also stores the transaction history with a timestamp for the data communication, power usage information transmitted out, and incoming remote commands sent to the connected SW 201 and ETH 202 units. The memory 317 provides for tracking of performance and remote debugging capability with pinging and path tracking capability for the MST 203, as well as for the connected SW 201 and ETH 202 units.

The MST 203 provides a power plug 303 of its own that is connected to the power distribution lines 301 through a power meter and relay 305 and that is used for connecting an appliance with the power and monitoring and control capability. This monitored information is sent to the MCU, which in this embodiment is implemented as an SOC 307. Such information is combined with the information received over the PLC network 200 via the power distribution lines 301 through the coupler filter module 311 and the communication module 309. This collected information forms part of the power monitoring information input to the MST 203. The power monitoring information is stored in the memory 317 and compiled and processed for transmission to the monitoring sources in the WAN 205 through the modem 204, which is connected to the SOC 307 port with the RJ45 connector 315. The transfer of the compiled information is performed as a store and forward manner in this embodiment, with storage in the memory 317 to enable best use of the available bandwidth of the gateway.

Remote control commands received via the gateway are received through a duplex port with the RJ45 connector 315 from the connected modem 204. These control commands are interpreted by the SOC 307 of the MST 203 and sent over the broadband PLC network 200 through communication module 309 and coupler filter module 311 to the respective SW 201 or ETH 202 units to which it is addressed for necessary action at the addressed receiving units.

Figure 4:
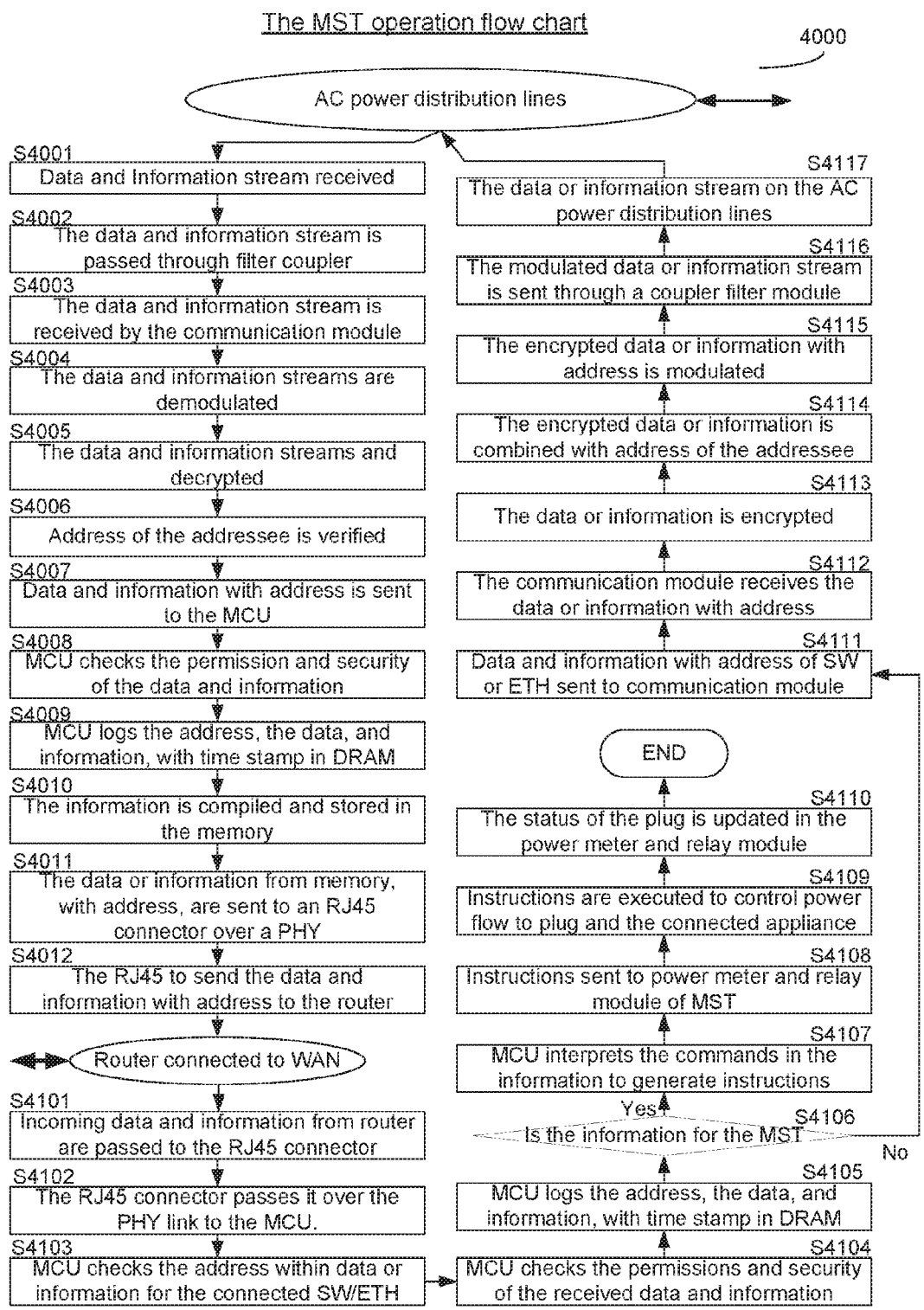
FIG. 4 is a flowchart showing master power switch unit (MST) operation according to the invention.

FIG. 4 is a flowchart 4000 showing duplex operation of the MST 203 to enable data communication and information transfer to and from the router, and thence to the AC power distribution lines 301, for transport over the Internet 205.

The MST 203 receives incoming data and information stream over the AC power distribution lines 301 (S4001). The data stream and information stream are transmitted over broadband PLC for the MST 203.

The received data and information streams are passed into the MST 203 through filter couplers (S4002). The coupler filter module 311 of the MST 203 has a high-pass filter that blocks the power frequency from entering the communication module 309 of the MST 203 and thus prevents the power frequency from contributing to noise.

The received communication and information streams are received by the communication module 309 (S4003). The MST 203 uses a single broadband communication module 309 to handle both the communication data stream and the information stream.

The communication module 309 demodulates the streams to extract the data, the information, and the addresses (S4004).

The communication module 309 decrypts the stream (S4005).

The address associated with the data and information streams is checked by the decrypting communication module 309 to verify the addressee (S4006).

The data and the information with the necessary address is sent to the MCU, which is part of the SOC 307, for logging and checking (S4007).

The MCU checks the permissions and security of the data and information (S4008).

The MCU logs the address of the data and information, with timestamp and other approved details, in the DRAM memory 317 buffer (S4009).

The logged information is consolidated, compiled and stored in a memory 317 to establish priority for transmission (S4010).

The data or the prioritized information from the memory 317, with the address details, is sent over a PHY for transport over the physical layer to the RJ45 connector 315 (S4011).

The data or information with the necessary address details is passed through to the router 204, connected to the RJ45 connector 315, for transport over the Internet 205 to the addressee (S4012).

In the reverse direction, when a return data or information stream comes from the Internet 205 to the router 204 with the Internet protocol (IP) address of the MST 203, it is converted into data or information at the router 204 and passed through the RJ45 connector 315 to the physical link connecting the RJ45 connector 315 to the MCU (S4101).

The data or information comes over the PHY link to the MCU (S4102).

The receiving MCU in the MST 203 checks the address within the data or information to determine if it is addressed to an ETH 202 unit or a SW 201 connected to the PLC network 200 (S4103).

The receiving MCU also checks for all security and permissions of the received data or information that are needed to access the connected devices (S4104).

The receiving MCU of the MST 203 logs the incoming data or information with timestamp and details in the memory 317 (S4105).

The receiving MCU checks to determine if the received information is addressed to the MST 203 (S4106).

If the received is information addressed to the MST 203, then the receiving MCU interprets the commands within the information stream to generate executable instructions for the power meter and relay module 305 of the MST 203 (S4107).

The receiving MCU sends the instructions to the local power meter and relay module 305 for action (S4108).

The local power meter in the power meter and relay module 305 executes the executable instructions to control the power flow to the power plug 303 through the relay in the power meter and relay module 305 of the MST 203 (S4109).

The status of the local power plug 303 is updated in the power meter and relay module 305 (S4110).

If the received information is not for the MST 203, then the data or information, with the address of the SW 201 or ETH 202, is sent to the communication module 309 of the MST 203 (S4111).

The appropriate communication module 309 of the MST 203 receives the data or the information with the address of the SW 201 or ETH 202 to which the data or information is addressed (S4112).

The communication module 309 encrypts the data or the information received (S4113).

The encrypted data or information is recombined with the address of the SW 201 or ETH 202 (S4114).

The communication module 309 modulates the data or information with the address to form a data or information stream (S4115).

The modulated streams are sent through a coupler filter module 311 that blocks unwanted frequencies being impressed on the AC power distribution lines 301 and also prevents the unwanted frequencies on the AC power distribution lines 301 entering the communication module 309 (S4116).

The coupler filter module 311 impresses the modulated data or information stream on the AC power distribution lines 301 for transmission to the connected addressee SW 201 or ETH 202 (S4117).

Figure 5:
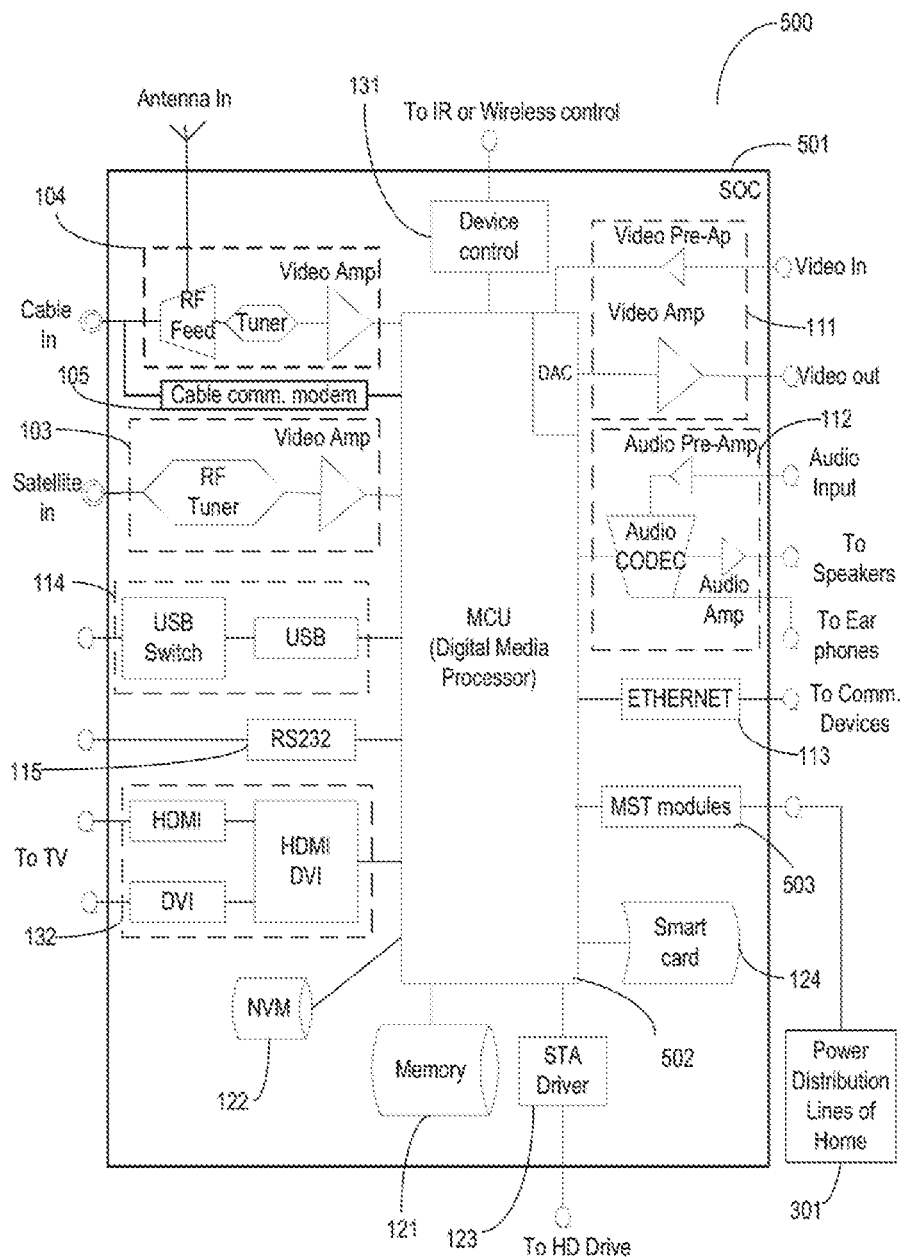
FIG. 5 is a block schematic diagram of an MST integrated with an STB to provide connectivity over a PLC network for communication and for power monitoring and control of connected appliances according to the invention.

FIG. 5 is a block schematic diagram of the STB 500 with the necessary modules 503 to integrate the MST 203 on an SOC 501. All the capabilities of the STB 100 are included in the STB 500, in addition to the MST 203. In a presently preferred embodiment, of the STB 500, some of the modules of the MST 203 are integrated into the SOC 501. The available common resources of the STB 500, such as MCU 502 and memory 121, are used in this embodiment of the integrated STB 500.

Figure 6:
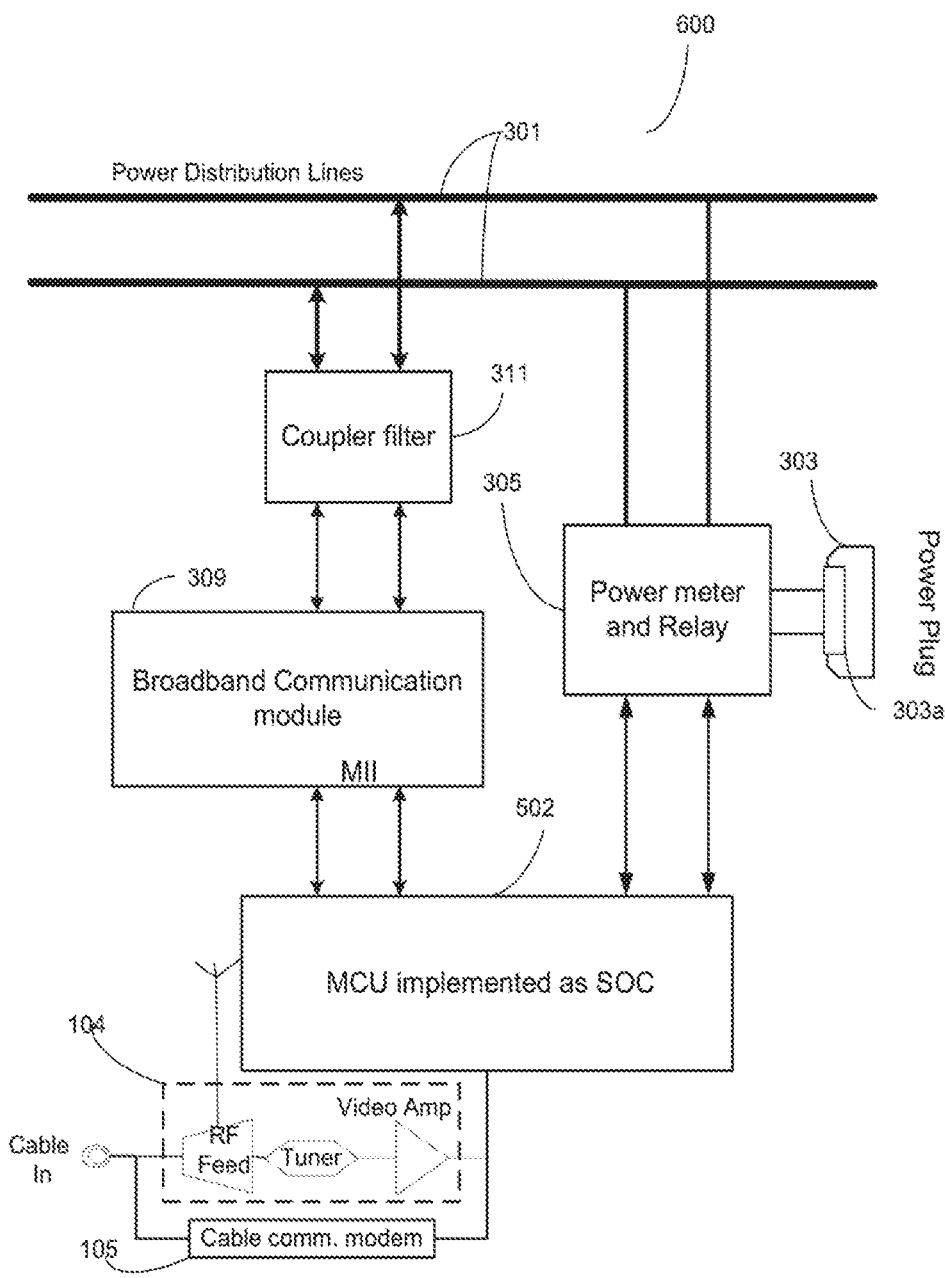
FIG. 6 is a block schematic diagram showing the various modules that are integrated to enable PLC networking and monitoring and control of connected appliances according to the invention.

FIG. 6 is a block schematic diagram 600 of the MST 203 implemented as part of the SOC 501 for a cable input connection. The video input 104 to the SOC 501 is provided through a tuner module 104 that includes an RF feed, a tuner, and the video amplifier. The communication and information input/output are provided through the integrated cable communication modem 105. The MCU 502 on the SOC 501 is used to perform all the necessary data and information processing needed. The memory 121 is used for any interim storage needs, as well as for storing and forwarding of the information. All communication and information between the MCU 502 and the PLC network 200 to associated SW 201 and ETH 202 units is via the power distribution lines 301. The data and control commands received through the cable communications modem 105 are received by the SOC 502 of the STB 500. If the data and control information is meant for the connected SW 201 and ETH 202 units, then this information is sent to the power distribution lines 301 by the MCU 502 in the SOC 501 via the broadband communication module 309 and the filter coupler 311. Similarly the data and information from the PLC network 200 is received by the MCU 502 on the SOC 501 through the filter coupler 311 and the communication module 309. The operation of the filter coupler and the communication module are as described earlier with respect to FIG. 3.

The integration of the MST modules 503 on the SOC 501 also provides a power plug 303 on the STB 500 that allows monitoring and control of the power to any appliance connected to it. The power monitoring and relay module 305 connected to the power plug controls and monitors the power flow through the power plug 303 based on instructions received from the MCU 502.

Figure 7:
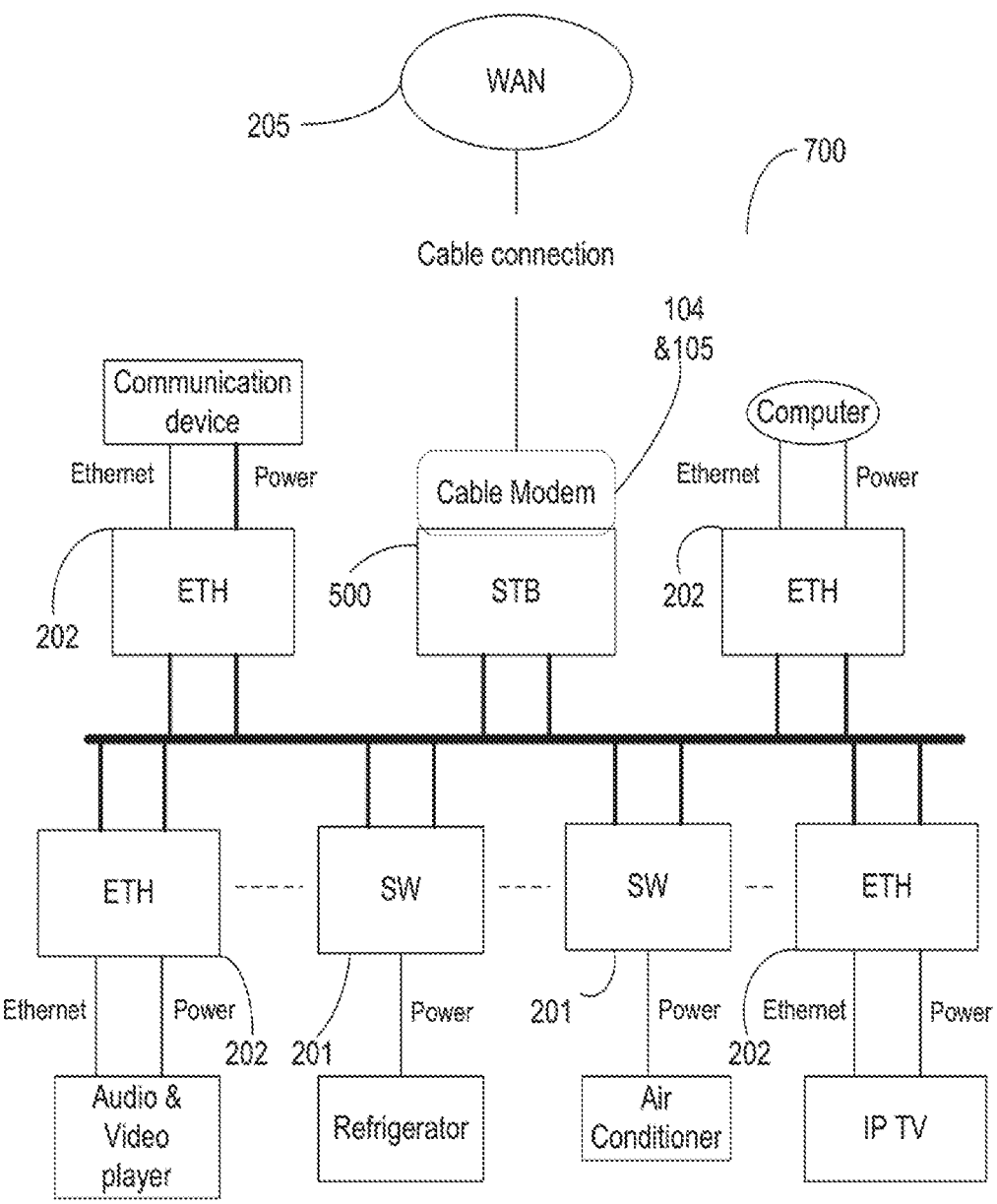
FIG. 7 is a block schematic diagram of a PLC network connection to provide communication streaming media capability with monitoring and control of connected appliances according to the invention.

FIG. 7 is a block schematic diagram of the STB 500 with a connected SW 201 and ETH 202 forming a PLC LAN for communication, streaming media delivery, and a PLC network for monitoring and remote control of power flow to connected appliances. The integrated STB 500 has the video tuner and amplifier 104 and the cable communications modem 105. The video tuner and amplifier module 104 is used to receive cable TV inputs. The cable communications modem 105 is used to receive and transmit communication data streams, transmit collected information and status of the power connection and usage of connected appliances to the Web, and receive remote commands to change the status of connections. In this setup, the STB 500 also controls the operation of the video and audio systems, as well as IP TV systems connected via the PLC network, directly or allow for local control at the connection point.

Figure 8:
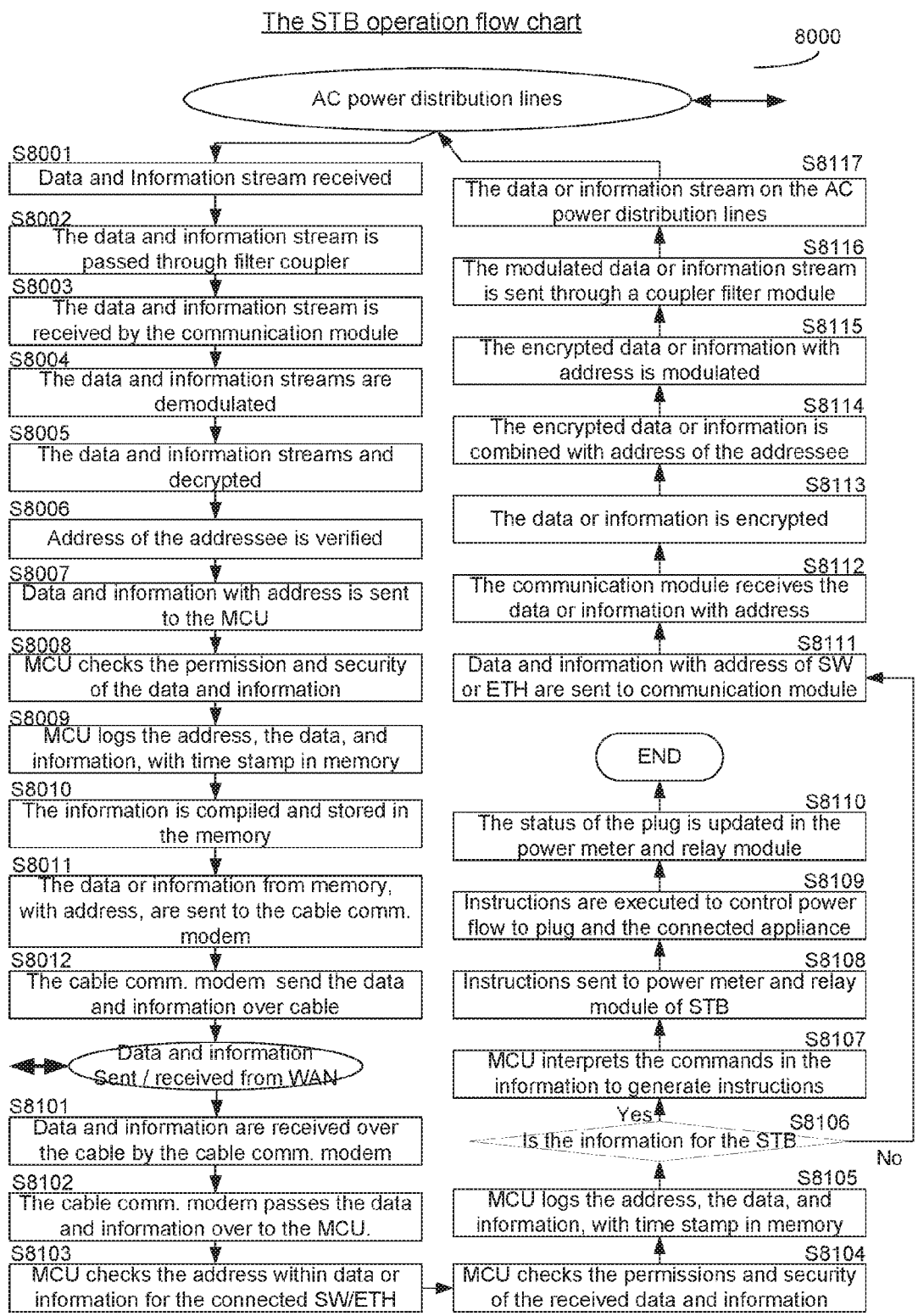
FIG. 8 is a flowchart showing operation of an integrated STB in a PLC network according to the invention.

FIG. 8 is a flowchart showing operation of the integrated modules 503 of the MST in the SOC 501.

The STB 500 receives an incoming data and information stream over the AC power distribution lines 301 (S8001). The data stream and information stream are received over broadband PLC network.

The received data and information streams are passed into the STB 500 through filter couplers 311 (S8002). The filter coupler module 311 is in the MST modules block 503 of the SOC 501. The filter coupler module 311 has a high-pass filter that blocks the power frequency from entering the communication module 309 of the STB 500 and thus prevents the power frequency from contributing to noise.

The received communication and information streams are sent and received by the communication module 309 of the MST module block 503 integrated on the STB 500 (S8003). The STB 500 uses the same broadband communication module 309 to handle both the communication data stream and the information stream.

The communication module 309 demodulates the streams to extract the data or the information and the addresses (S8004).

The communication module 309 decrypts the stream (S8005).

The addresses, associated with the data streams are checked by the decrypting communication module 309 to verify the addressee (S8006.)

The data and the information with the necessary address are sent to the MCU 502, which is part of the SOC 501 for logging and checking (S8007).

The MCU 502 checks the permissions and security of the data and information (S8008).

The MCU 502 logs the address of the data and information, with timestamp and other approved details, in the memory 121 buffer (S8009).

The logged information is consolidated, compiled, and stored in a memory 121 to establish priority for transmission (S8010).

The data or the prioritized information, with the address details, is sent from the memory 121 to the cable modem 105 (S8011).

The data or information, with the necessary address details, is passed through to the cable communications modem 105 connected to cable input for transport over the cable to the internet 205 to the addressee (S8012).

In the reverse direction, when a return data or information stream comes from the Internet 205 through the cable to the cable communications modem 105 via the cable input, with the IP address of the STB 500, it is converted into data or information at the cable communications module 105 and passed through the cable input to the MCU 502 (S8101).

The data or information is sent to the MCU 502 (S8102). Additional information to control the video and audio systems connected on the PLC network 700 is also generated by the SOC 501 and provided to the MCU 502.

The receiving MCU 502 in the SOC 501 checks the address within the data or information to determine if it is addressed to an ETH 202 unit or a SW 201 connected to the PLC network 700 (S8103).

The receiving MCU 502 also checks for all security and permissions of the received data or information that are needed to access the connected devices (S8104).

The receiving MCU 502 of the STB 500 logs the incoming data or information with timestamp and details in the memory 121 (S8105).

The receiving MCU 502 checks to determine if the received information is addressed to the STB 500 (S8106).

If the received is information addressed to the STB 500, then the receiving MCU 502 interprets the commands within the information stream to generate executable instructions for the power meter and relay module 305 of the STB 500 (S8107).

The receiving MCU 502 sends the instructions to the local power meter and relay module 305 for action (S8108).

The local power meter in the power meter and relay module 305 executes the executable instructions to control the power flow to the power plug 303 through the relay in the power meter and relay module 305 of the STB 500 (S8109).

The status of the local power plug 303 is updated in the power meter and relay module 305 (S8110).

If the received information is not for the STB 500, then the data or information, with the address of the SW 201 or ETH 202, is sent to the communication module 309 of the STB 500 (S8111).

The appropriate communication module 309 of the STB 500 receives the data or information and the address of the SW 201 or ETH 202 to which the data or information is addressed (S8112).

The communication module 309 encrypts the data or the information received (S8113).

The encrypted data or information is recombined with the address of the SW 201 or ETH 202 (S8114).

The communication module 309 modulates the data or information with the address to form a data or information stream (S8115).

The modulated streams are sent through a coupler filter module 311 that blocks unwanted frequencies being impressed on the AC power distribution lines 301 and that also prevents the unwanted frequencies on the AC power distribution lines 301 entering the communication module 309 (S8116).

The coupler filter module 311 impresses the modulated data or information stream on the AC power distribution lines 301 for transmission to the connected addressee SW 201 or ETH 202 (S8117).

The ETH 202 devices enable connection of communication devices to the PLC LAN, while providing a power plug 303 which can be monitored and controlled.

Multiple SW 201 and ETH 202 units can establish the power monitoring and control for the home via the PLC network 200 and provide connectivity for data communication via the PLC LAN level.

The use of a single STB 500 for the home PLC network 200 establishes a WAN gateway that enables the PLC LAN to communicate with the outside world in accordance with predetermined security and connection rules. The STB 500 is also used as a collection and compilation point for the power monitoring function where the power usage within the home with connected SW 201 and ETH 202 units is received and compiled. Because there is connectivity with control capability on each SW and ETH unit, the power delivery through each of these SW and ETH units can be monitored and controlled from any of the communication devices connected to the PLC LAN. Further, this collected information on any of the power plugs can be accessed from the WAN using connected communication devices to monitor the status and provide remote control commands through the WAN gateway. This capability is controlled by the permissions, authorizations, and security rules established for connection into the PLC LAN through the STB 500.

Because communication connections to the outside world and within the PLC network 700 are all broadband enabled, the system is able to provide steaming media capability within the PLC network 700. It can access and enable streaming media delivery to display devices connected using ETH units through the WAN gateway. The STB 500 is also enabled to exert control over the connected audio and video systems and other connected entertainment units connected to the PLC network 700.

To facilitate macro level collection and compilation of power usage information, the collected power monitoring and usage information is transmitted over the WAN gateway to one or more central power usage collection units. These units collect the data for analysis and to provide input to the public bodies for making policy decisions on greenhouse gas reduction requirements.

Although the invention is described herein with reference to the preferred embodiment, one skilled in the art will readily appreciate that other applications may be substituted for those set forth herein without departing from the spirit and scope of the present invention. For example, the units may be implemented as an assembly of individual components, as a combination of components and integrated circuits, or as one or more SOCs. The invention should not be considered as being limited in scope based on specific block level details, but should be considered on the basis of current and future envisioned functionality. Accordingly, the invention should only be limited by the Claims included below.

The invention claimed is:

1. A system configured to receive control signals and streaming of audio, video, or graphic information over a wide area network (WAN), wherein the system comprises:
 a digital media processor (MCU);
 a communication module;
 a communication link between the MCU and to the WAN; and
 a master switch (MST);
 wherein the MST is configured for connection to the WAN through the communication link, wherein the MST is communicatively connected to a power line communication (PLC) local area network (LAN) established on a power line;
 wherein the MST is connected to at least one sensor over the PLC LAN;
 wherein the at least one sensor is connected to the power line and to a corresponding appliance, wherein the corresponding appliance is powered by power from the power line under control of the at least one sensor;
 wherein the at least one sensor is configured to:
  collect power usage information of the corresponding appliance,
  transmit the collected power usage information to the MST over the PLC LAN,
  receive control commands over the PLC network from the MST; and
  switch power on and off to the corresponding appliance in response to the received control commands;
 wherein the MST is configured to receive the collected power usage information over the PLC LAN from the at least one sensor;
 wherein the MST is configured to connect the system with the PLC LAN for transferring data, control, and streaming video through the communication link;
 wherein the communication module is configured to modulate the data, control and streaming video for transfer over the PLC LAN to the corresponding appliance connected through the at least one sensor within the PLC LAN;
 wherein the communication module is further configured to receive responses and communication inputs sent as modulated signals from the corresponding appliance connected to the PLC LAN through the at least one sensor, and demodulate the received inputs to transfer the received inputs to the WAN; and wherein the MST is configured to receive control signals through the WAN, transmit the control signals to the at least one sensor through the PLC LAN, receive control responses over the PLC LAN from the at least one sensor, consolidate the collected power usage information, and transfer any of the control responses or the consolidated power usage information to the WAN over the communication link.

2. The system of claim 1, wherein the communication link includes any of a cable modem or a video tuner/amplifier.

3. The system of claim 1, further comprising:

a coupler filter, wherein the coupler filter is configured for any of:

preventing unwanted frequencies from being impressed on the communication module from the PLC LAN; and preventing unwanted high frequency noise from being impressed on the PLC LAN from the communication module.

4. The system of claim 1, wherein the MCU is configured to monitor and control power usage of the corresponding appliance.

5. The system of claim 1, further comprising:

a power plug connected to the PLC LAN;

wherein the MCU is configured to monitor and control the power plug via the PLC LAN.

6. The system of claim 1, wherein the MCU is configured to communicate via the PLC LAN with the corresponding appliance for any of power monitoring and control of the corresponding appliance and to provide connectivity for data communication with the corresponding appliance via the PLC LAN.

7. The system of claim 1, wherein the MCU is configured to operate the system as a gateway in accordance with predetermined security and connection rules.

8. The system of claim 1, wherein the MCU is configured to operate the system as a collection and compilation point for a power monitoring function in which power usage by the corresponding appliance is received and compiled by the MCU.

9. The system of claim 1, wherein the MCU is configured to monitor and control power delivery through the corresponding appliance in response to control information from another appliance connected to the PLC.

10. The system of claim 1, wherein the MCU is configured for any of sending control signals to, to and collecting information from the corresponding appliance in response to remotely originated control information received via the WAN.

11. The system of claim 1, wherein the MCU is configured for macro level collection and compilation of power usage information with regard to the corresponding appliance; and wherein the MCU is configured to transmit the collected power monitoring and usage information over the WAN to one or more remotely located, central power usage collection units.

12. The system of claim 1, wherein the MST is connected to an associated appliance, wherein the associated appliance is powered by power from the power line under control of the MST, and wherein the MST is configured to collect power usage information for the associated appliance.

13. The system of claim 1, wherein the at least one sensor is any of a power switch (SW), or a communication enabled power switch (ETH).

14. The system of claim 4, wherein the MCU is configured to collect and to compile information related to the power usage and control and to exchange the information between the WAN and an Internet.

15. The system of claim 4, wherein the MCU is configured to operate the system as a gateway between the WAN and the PLC.

16. The system of claim 4, wherein the MCU is configured to control operation of entertainment devices connected to the PLC LAN.

17. The system of claim 12, wherein the MST is enabled to consolidate the stored power usage information received from the at least one sensor with the power usage information for the associated appliance.

18. A method, comprising:

receiving by a system control signals and streaming of audio, video, or graphic information from a wide area network (WAN), wherein the system includes a digital media processor (MCU), a communication module, a communication link the MCU and to the WAN, and a master switch (MST);

wherein the MST is connected to the WAN through the communication link, wherein the MST is communicatively connected to a power line communication (PLC) local area network (LAN) established on a power line;

wherein the MST is connected to at least one sensor over the PLC LAN;

wherein the at least one sensor is connected to the power line and to a corresponding appliance, wherein the corresponding appliance is powered by power from the power line under control of the at least one sensor;

wherein the at least one sensor is configured to:

collect power usage information of the corresponding appliance, transmit the collected power usage information to the MST over the PLC LAN, receive control commands over the PLC LAN from the MST; and switch power on and off to the corresponding appliance in response to the received control commands;

wherein the MST stores the collected power usage information received from the at least one sensor;

wherein the MST connects the system with the PLC LAN for transferring data, control, and streaming video through the communication module;

modulating the data, control and streaming video with the communication module for transfer over the PLC LAN to the corresponding appliance connected through the at least one sensor within the PLC LAN;

with the communication module, receiving inputs that are sent as modulated signals from the corresponding appliance connected to the PLC LAN through the at least one sensor;

demodulating the received inputs, and transferring the received inputs to the WAN;

with the MST, receiving control signals through the WAN, transmitting the control signals to the at least one sensor through the PLC LAN, receiving control responses over the PLC LAN from the at least one sensor, consolidating the collected power usage information, and transferring any of the control responses or the consolidated power usage information to the WAN over the communication link.

19. The method of claim 18, wherein the communication link includes any of a cable modem or a video tuner/amplifier.

20. The method of claim 18, wherein the system includes a coupler filter, and wherein the method further comprises any of:
   with the coupler filter, preventing unwanted frequencies from being impressed on the communication module from the PLC LAN; or
   with the coupler filter, preventing unwanted high frequency noise from being impressed on the PLC LAN from the communication module.

21. A non-transitory storage medium containing program instructions which, when executed by a processor, implement the method of claim 18.

22. The method of claim 18, wherein the MCU monitors and controls power usage of the corresponding appliance.

23. The method of claim 18, wherein the MCU collects and compiles information related to the power usage and control and to exchange the information between the WAN and an Internet.

24. The method of claim 18, wherein the MCU operates the system as a gateway between the WAN and the PLC LAN.

25. The method of claim 18, wherein the MCU controls operation of entertainment devices connected to the PLC LAN.

26. The method of claim 18, wherein the MST is connected to an associated appliance, wherein the associated appliance is powered by power from the power line under control of the MST, and wherein the MST is configured to collect power usage information for the associated appliance.

27. The method of claim 18, wherein the at least one sensor is any of
   a power switch (SW), or
   a communication enabled power switch (ETH).

28. The method of claim 26, wherein the MST is enabled to consolidate the stored power usage information received from the at least one sensor with the power usage information for the associated appliance.

* * * * *